(12) United States Patent
Harada et al.

(10) Patent No.: US 8,240,255 B2
(45) Date of Patent: Aug. 14, 2012

(54) BODY FRAME STRUCTURE OF RAILWAY VEHICLE

(75) Inventors: Hiroji Harada, Higashi-Osaka (JP); Tomonori Sumikawa, Higashi-Osaka (JP); Yasuhiro Tanaka, Higashi-Osaka (JP); Eiichi Kato, Higashi-Osaka (JP)

(73) Assignee: The Kinki Sharyo Co., Ltd., Osaka (JP)

( * ) Notice: Subject to any disclaimer, the term of this patent is extended or adjusted under 35 U.S.C. 154(b) by 156 days.

(21) Appl. No.: 12/516,597

(22) PCT Filed: Nov. 30, 2006

(86) PCT No.: PCT/JP2006/323917
§ 371 (c)(1),
(2), (4) Date: Jan. 12, 2010

(87) PCT Pub. No.: WO2008/068796
PCT Pub. Date: Jun. 12, 2008

(65) Prior Publication Data
US 2010/0132589 A1    Jun. 3, 2010

(51) Int. Cl.
*B61D 25/00* (2006.01)
(52) U.S. Cl. ........................ 105/396; 105/404
(58) Field of Classification Search .................. 105/396, 105/397, 404, 409; 296/186.1, 191, 203.03
See application file for complete search history.

(56) References Cited

U.S. PATENT DOCUMENTS

| | | | | |
|---|---|---|---|---|
| 3,774,553 A | * | 11/1973 | Kunst et al. | 105/401 |
| 5,218,799 A | * | 6/1993 | Appino | 52/213 |
| 5,333,554 A | * | 8/1994 | Yamada et al. | 105/397 |
| 5,383,406 A | * | 1/1995 | Vanolo et al. | 105/401 |
| 6,302,031 B1 | * | 10/2001 | Smith et al. | 105/404 |
| 7,210,413 B2 | * | 5/2007 | Barry et al. | 105/404 |
| 7,789,023 B2 | * | 9/2010 | Forbes | 105/396 |
| 7,958,831 B2 | * | 6/2011 | Campus | 105/396 |
| 2002/0024235 A1 | * | 2/2002 | Campus | 296/203.01 |
| 2005/0066506 A1 | * | 3/2005 | Campus et al. | 29/428 |

(Continued)

FOREIGN PATENT DOCUMENTS

JP        59-11957        1/1984

(Continued)

OTHER PUBLICATIONS

English language Abstract of JP 2006-341813, Dec. 21, 2006.

(Continued)

*Primary Examiner* — Lars A Olson
*Assistant Examiner* — Jason C Smith
(74) *Attorney, Agent, or Firm* — Greenblum & Bernstein P.L.C.

(57) ABSTRACT

A body frame structure having practically sufficient strength is provided. The body frame structure has a simple structure that can be obtained by simple joining operation. Vertically and horizontally arranged first and second frame members are weld-joined to an outer panel with an end portion of the second frame member facing a side surface of the first frame member. The first frame member is placed in a straddling manner on the outer panel and the end portion of the second frame member weld-joined to the outer panel and is weld-joined to both the second frame member and the outer panel. In this manner, even when the vertically and horizontally arranged first and second frame members are laser-welded to the outer panel, the joint strength can be improved without using a joint plate.

6 Claims, 8 Drawing Sheets

U.S. PATENT DOCUMENTS

| | | | |
|---|---|---|---|
| 2006/0065152 A1* | 3/2006 | Heitmeyer et al. | 105/404 |
| 2006/0225604 A1* | 10/2006 | Nakamura et al. | 105/396 |
| 2007/0214998 A1* | 9/2007 | Komaki et al. | 105/396 |
| 2007/0284913 A1* | 12/2007 | Ehrlich | 296/186.1 |
| 2010/0077935 A1* | 4/2010 | Harada et al. | 105/397 |
| 2010/0089283 A1* | 4/2010 | Kono et al. | 105/397 |
| 2010/0132589 A1* | 6/2010 | Harada et al. | 105/397 |

FOREIGN PATENT DOCUMENTS

| | | |
|---|---|---|
| JP | 5-262228 | 10/1993 |
| JP | 9-30414 | 2/1997 |
| JP | 2843899 | 10/1998 |
| JP | 11-278258 | 10/1999 |
| JP | 2001-138907 | 5/2001 |
| JP | 2005-329412 | 12/2005 |
| JP | 2006-27366 | 2/2006 |
| JP | 2006-341813 | 12/2006 |
| WO | 2005/110663 | 11/2005 |

OTHER PUBLICATIONS

English language Abstract of JP 2006-27366, Feb. 2, 2006.
English language Abstract of JP 2005-329412, Dec. 2, 2005.
English language Abstract of JP 11-278258, Oct. 12, 1999.
English language Abstract of JP 2001-138907, May 22, 2001.
English language Abstract of JP 9-30414, Feb. 4, 1997.
English language Abstract of JP 5-262228, Oct. 12, 1993.
English language Abstract of JP 7-284932, Oct. 31, 1995.
U.S. Appl. No. 12/516,673 to Kono et al., filed May 28, 2009.
U.S. Appl. No. 12/516,600 to Harada et al., filed May 28, 2009.

* cited by examiner

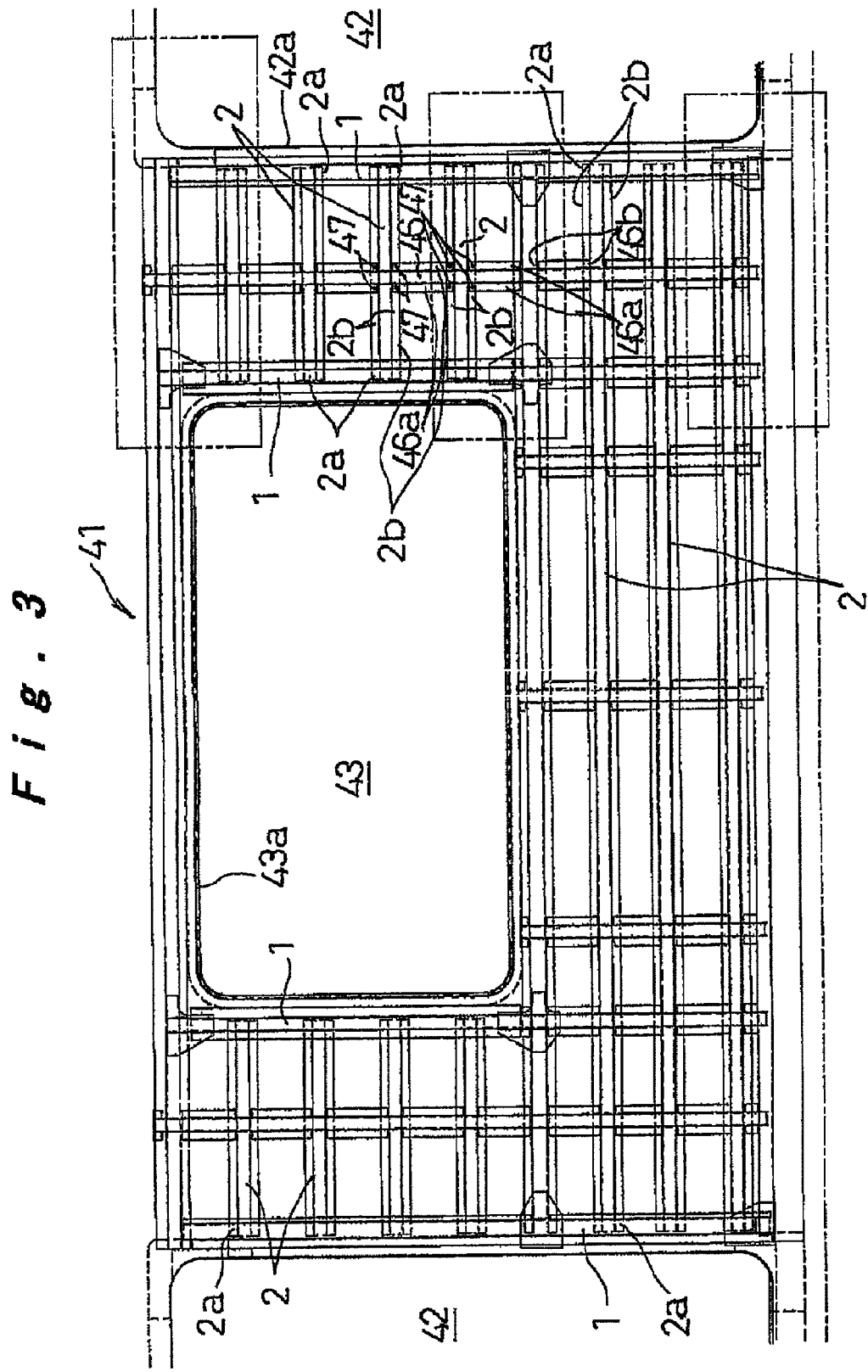

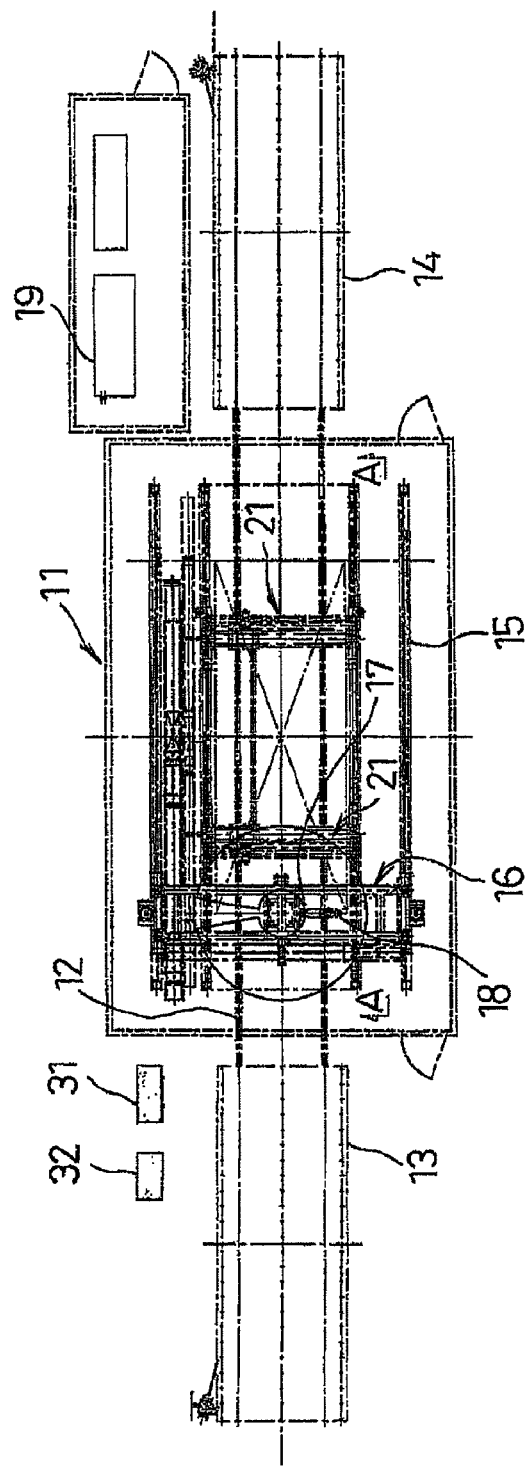
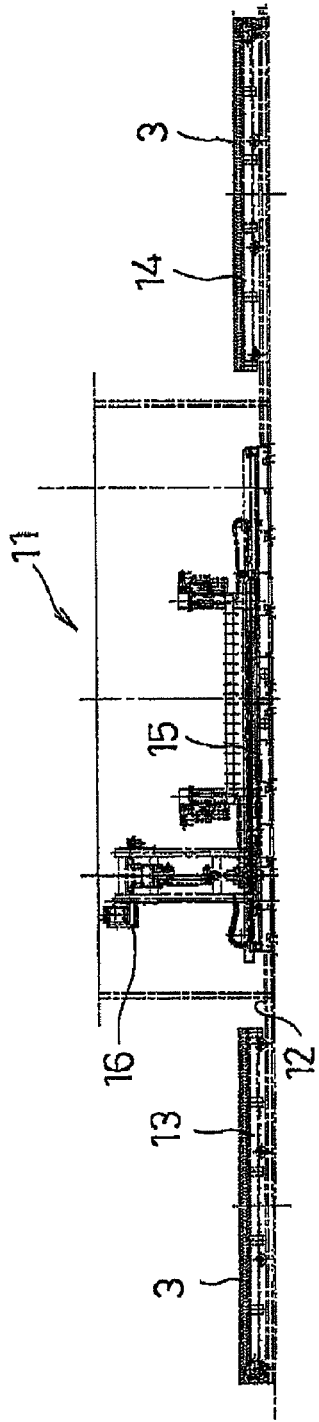

BODY FRAME STRUCTURE OF RAILWAY VEHICLE

TECHNICAL FIELD

The present invention relates to a body frame structure of a railway vehicle, and in particular, to a body frame structure of a railway vehicle which includes vertically and horizontally arranged first and second frame members weld-joined to an outer panel with an end portion of the second frame member facing a side surface of the first frame member.

BACKGROUND ART

A body frame structure of a railway vehicle that includes vertically and horizontally arranged first and second frame members weld-joined to an outer panel with an end portion of the second frame member facing a side surface of the first frame member is already known (see, for example, Patent Document 1). As shown in FIGS. 7A and 7B, in the configuration of such a body frame structure, a side surface of a vertical frame member a having a hat-shaped cross-section faces an end portion of a horizontal frame member b having a hat-shaped cross-section. In the facing area, flanges b1 of the horizontal frame member b are placed on a flange a1 of the vertical frame member a in an overlapping manner. The frame members a and b including the overlapping area are spot-welded to an outer panel c at welding points d in the manner shown in FIG. 7C.

However, in the above joint structure, the vertical frame member a and the horizontal frame member b are simply joined with the flanges a1 and b1 overlapping with each other, and the material and structural characteristics of the hat-shaped cross-section are not effectively utilized. Therefore, even with such a hat-shaped cross-section the joint strength of this joint structure is low, and the buckling strength of the outer panel cannot be improved. In view of the above, in the body frame structure described in Patent Document 1, a joint plate e shown by phantom lines in FIGS. 7A and 7B is placed on the frame members a and b and is spot-welded at weld-joining points d to obtain the required strength.

[Patent Document 1] Japanese Patent Application Laid-Open No. H09-30414.

DISCLOSURE OF THE INVENTION

Problems to be Solved by the Invention

However, since a load of about 1 t is applied during the spot welding process, indentations are formed on the outer surface, resulting in the deterioration of the appearance. In addition, much time and labor are required for joining, and the cost increases. A further improvement in spot-welding rate is not expected in the future. Moreover, a large apparatus is required since a large load is used, and an expensive copper-made electrode plate g shown in FIG. 7C must be used, so that the cost for the equipment is high. In addition to this, the joint plate e having a three-dimensional structure as in the body frame structure described in Patent Document 1 is separately produced and is attached by spot-welding. This causes a further increase in cost. If the joint plate e is not used and the spot-welding intervals are reduced to address the above problems, the appearance further deteriorates, and the cost increases in proportion to the increase in the number of spot-welding points. Moreover, since there is a limit to the reduction in spot-welding intervals, arc welding is used instead of spot welding in some cases to ensure sufficient strength that depends on the type and application of vehicle. However, with arc welding, the outer panel is strongly affected by heat, so that the outer surface must be subjected to finishing processing. This also causes an increase in cost.

To avoid the above problems, laser welding may be performed along thick lines f in FIGS. 8A and 8B in the manner shown in FIG. 8C. However, the penetration width is narrow by means of laser welding, and the advantages of continuous joining are not enjoyed in the end portions of frame members a and b. Moreover, since a concentrated force may be exerted on the edges of the laser-welded portions f, the joining strength may be insufficient. Therefore, a joint plate e must be used, and the cost is still high.

It is an object of the present invention to provide a body frame structure of a railway vehicle in which, even when vertically and horizontally arranged frame members are laser-welded to an outer panel, high joint strength can be obtained without a joint plate and which has practically sufficient strength although the structure and the joining operation are simple.

Means for Solving the Problems

To achieve the above object, a body frame structure of a railway vehicle according to the present invention includes vertically and horizontally arranged first and second frame members and an outer panel, the frame members being weld-joined to the outer panel with an end portion of the second frame member facing a side surface of the first frame member. This body frame structure is mainly characterized in that the first frame member is placed in a straddling manner on the outer panel and the end portion of the second frame member weld-joined to the outer panel and is weld-joined to both the second frame member and the outer panel.

In the above configuration, the first frame member is placed in a straddling manner on the outer panel and the end portion of the second frame member weld-joined to the outer panel and is weld-joined to both the second frame member and the outer panel. Therefore, the entire end portion of the second frame member has a structure that is to be weld-joined to the outer panel and is disposed below the first frame member in an overlapping manner while the three-dimensional structural shapes of both the frame members utilizing the material and structural characteristics are maintained. This entire end portion of the second frame member is also weld-joined to the first frame member weld-joined to the outer panel. In this case, each of the vertically and horizontally arranged first and second frame members can be continuously laser welded to the outer panel. In this manner, the concentration of stress on the end portion of the second frame member can be prevented, while the joint strength between the vertically and horizontally arranged first and second frame members is improved. With this joint structure, which can be easily obtained at low cost, the concentration of stress on the end portion of the second frame member can be prevented irrespective of the welding method, while the joint strength between the vertically and horizontally arranged first and second frame members is improved. Moreover, since the continuity of the weld-joining of each of the vertically and horizontally arranged first and second frame members to the outer panel is not impaired, the joining can be suitably obtained using laser welding in an easier and productive manner.

In another configuration, the first frame member is disposed along an opening for a window or an entrance door. In railway vehicles, the outer panel is often reinforced by long horizontal frame members extending in the lengthwise direction. In such a case, the vertical frame member disposed along the opening for the window or entrance door has a side surface facing the end portions of a large number of horizontal frame members. Therefore, the joint strength between these frame members and the joining strength between the outer panel and these frame members are important issues. The above configuration is effective to improve the joint strength and the joining strength. As described above, in railway vehicles, the vertical frame member disposed along an opening for a window or an entrance doors has a side surface facing the end portions of a large number of horizontal frame members, and the strength in the facing area is an important issue. With the above configuration, sufficient strength is ensured easily in the facing area. Moreover, the laser weld-joined portion continuous along the opening preferably serves as a waterproof measure to prevent rainwater from entering through the opening.

In another configuration, the first frame member is an opening frame or an opening frame member of the opening for the window or the entrance door. In this configuration, the first frame member serves also as the opening frame or the opening frame member of the opening for the window or the entrance door, and the joint strength and the joining strength can be improved.

In another configuration, the second frame member has a hat-shaped cross-section and includes flanges on both sides thereof, the flanges being placed on and weld-joined to the outer panel by laser welding. The first frame member has a hat-shaped cross-section or a Z-shaped cross-section and includes flanges on both sides thereof. One of the flanges of the first frame member is placed on and weld-joined to the end portion of the second frame member by one of laser welding, spot welding, and plug welding, and the other flange of the first frame member is placed on and weld-joined to the outer panel by laser welding. With this configuration, the vertically and horizontally arranged first and second frame members can be laser welded to the outer panel, and the joint strength and the joining strength can be improved.

Other objects and features of the present invention will be apparent from the following detailed description when read in conjunction with the drawings. Each of the features of the present invention may be used alone or in various practicable combinations.

BRIEF DESCRIPTION OF THE DRAWINGS

FIG. 3 is a front view from the inner side illustrating a side body to which one of the exemplary joining structures shown in FIGS. 1A, 1B, 2A, and 2B is applied.

FIGS. 6A and 6B show the laser welding facility shown in FIG. 5, FIG. 6A being a plan view, FIG. 6B being a front view.

BEST MODE FOR CARRYING OUT THE INVENTION

With reference to FIGS. 1A to 6B, embodiments of the body frame structure of a railway vehicle of the present invention will be specifically described to facilitate the understanding of the present invention.

Figure 1A:
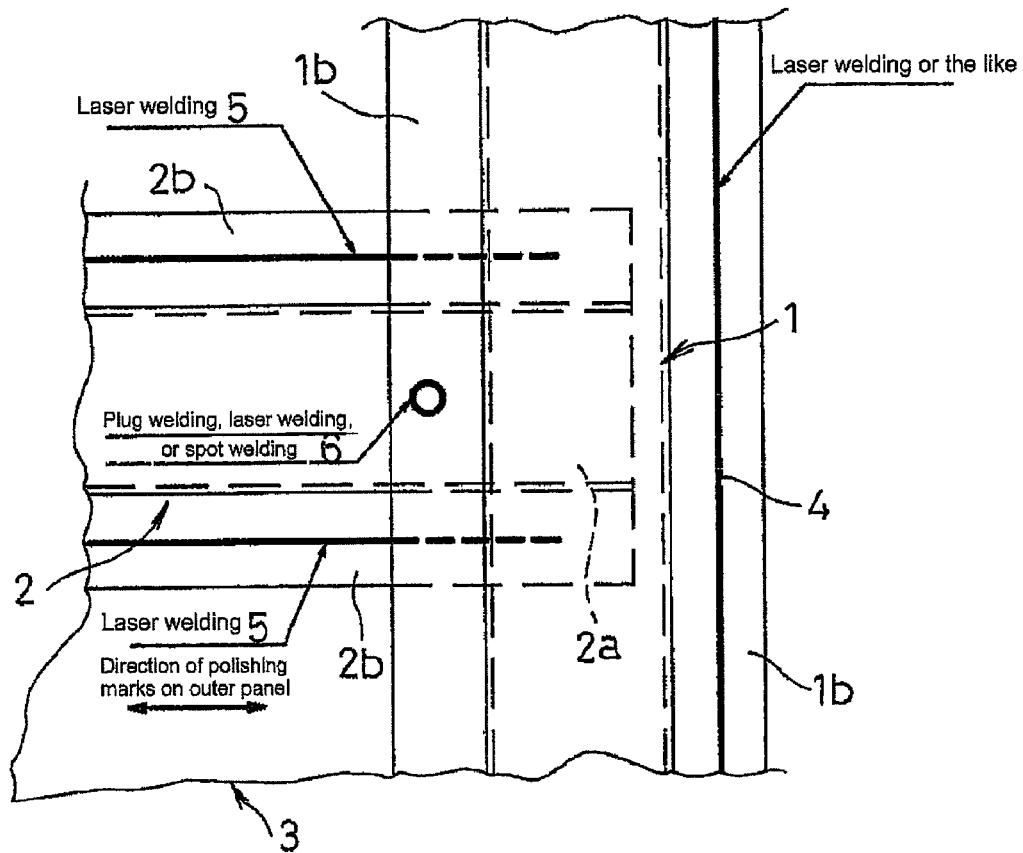
FIGS. 1A and 1B show an example of the joint structure of an outer panel and vertically and horizontally arranged frame members of a railway vehicle in an embodiment of the present invention, FIG. 1A being a front view from the inner side, FIG. 1B being a plan view.
Figure 1B:
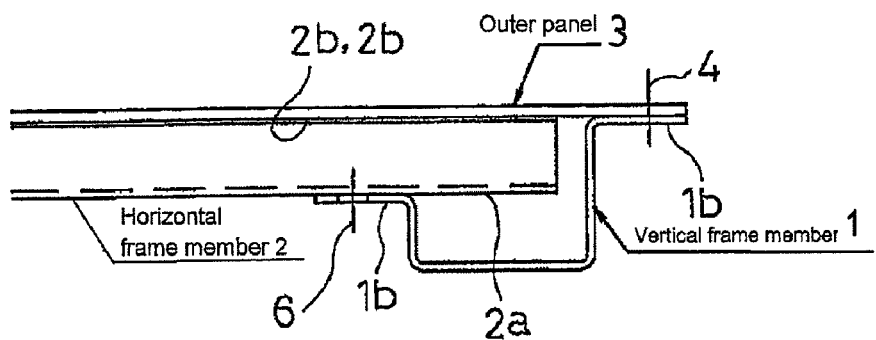
Figure 2A:
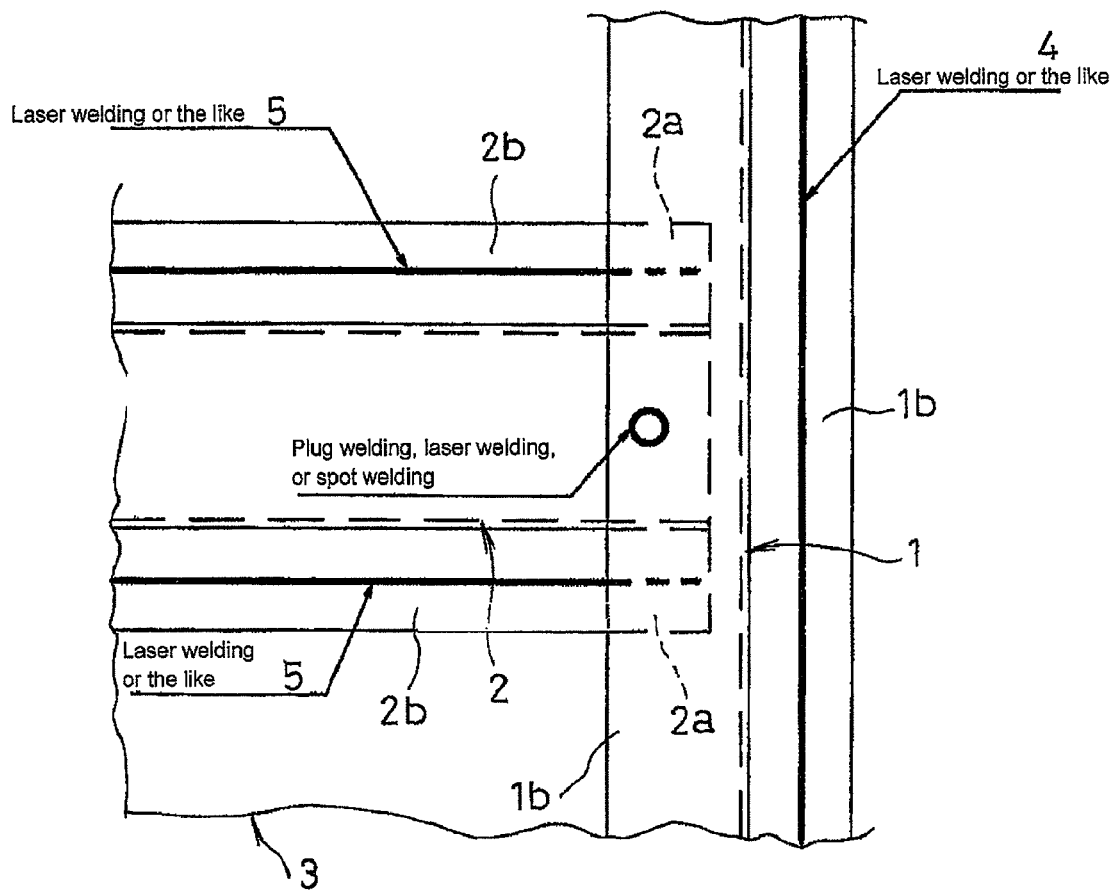
FIGS. 2A and 2B show another example of the joint structure of the outer panel and the vertically and horizontally arranged frame members of the railway vehicle in the embodiment of the present invention, FIG. 2A being a front view from the inner side, FIG. 2B being a plan view.
Figure 2B:
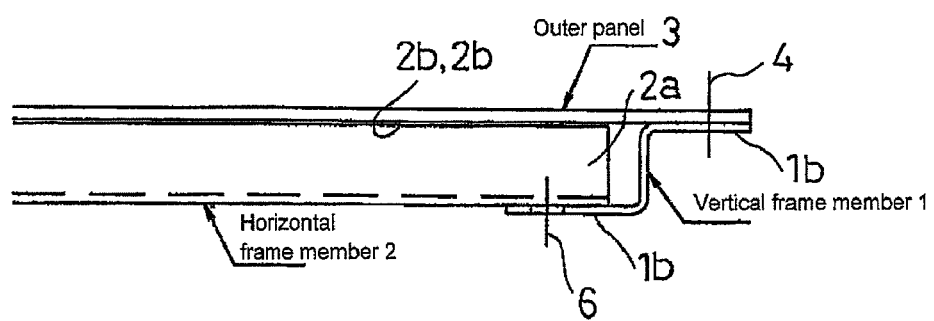

As shown in the example shown in FIGS. 1A and 1B and in the example shown in FIGS. 2A and 2B, in the embodiment of the body frame structure of a railway vehicle, vertically and horizontally arranged first and second frame members 1 and 2 are weld-joined to an outer panel 3 with an end portion 2a of the second frame member 2 facing a side surface of the first frame member 1. To reinforce the outer panel 3, the first frame member 1 is placed in a straddling manner on the outer panel 3 and the end portion 2a of the second frame member 2 weld-joined to the outer panel 3 at weld-joining portions 5 and is weld-joined to both the second frame member 2 and the outer panel 3 at weld-joining portions 6 and 4. As described above, the first frame member 1 is placed in a straddling manner on the outer panel 3 and the end portion 2a of the second frame member 2 weld-joined to the outer panel 3 and is weld-joined to both the second frame member 2 and the outer panel 3. Therefore, the entire end portion 2a of the second frame member 2 has a structure that is to be weld-joined to the outer panel 3 and is disposed below the first frame member 1 in an overlapping manner while the three-dimensional structural shapes of both the frame members utilizing the material and structural characteristics are maintained. This entire end portion 2a of the second frame member 2 is also weld-joined to the first frame member 1 weld-joined to the outer panel. Furthermore, each of the vertically and horizontally arranged first and second frame members 1 and 2 can be continuously laser welded to the outer panel 3. In this manner, the concentration of stress on the end portion 2a of the second frame member 2 can be prevented while the joint strength between the vertically and horizontally arranged first and second frame members 1 and 2 is improved. The weld joining of the vertically and horizontally arranged first and second frame members 1 and 2 with sufficient strength can be easily and reliably achieved by plug welding using a through hole, such as the weld-joining portion 6 shown in FIGS. 1A, 1B, 2A, and 2B, formed in the frame member 1 disposed on the frame member 2. In place of plug welding, laser welding or spot welding can be used. When laser welding or spot welding is used, it is preferable to perform the welding at a plurality of points or along a plurality of lines to ensure the required joining strength. Preferably, in terms of the weld-joining strength and the appearance, the laser welding of the vertically and horizontally arranged first and second frame members 1 and 2 to the outer panel 3 is performed such that the depth of penetration t into the outer panel 3 is 0.1 mm to about 50% of the thickness of the outer panel 3.

As described above, both the vertically and horizontally arranged first and second frame members 1 and 2 are weld-joined to the outer panel 3. In addition, the entire end portion 2a of the second frame member 2 has a structure weld-joined to the outer panel 3 and is disposed below the first frame member 1 in an overlapping manner while the three-dimensional structural shapes of both the frame members utilizing the material and structural characteristics are maintained. More specifically, the end portion 2*a* of the second frame member 2 is weld-joined to the continuously laser-welded first frame member 1, and this joint structure is formed in the continuously laser welded portion and can be easily obtained at low cost. With this joint structure, the concentration of stress on the end portion 2*a* of the second frame member 2, particularly on the edges of the laser weld-joined portions, can be prevented irrespective of the welding method while the joint strength between the vertically and horizontally arranged first and second frame members 1 and 2 is improved. Advantageously, since the continuity of the weld-joining of the vertically and horizontally arranged frame members 1 and 2 to the outer panel 3 is maintained, the joining can be achieved by laser welding in an easier and productive manner, as in the weld-joining portions 4 and 5 shown by the continuous thick lines in FIGS. 1A and 2A. Moreover, the above structure is also suitable for weld-joining stainless steel-made frame members 1 and 2 to a stainless steel-made outer panel 3.

More specifically, as shown in the examples in FIGS. 1A and 2A, the second frame member 2 has a hat-shaped cross-section, and flanges 2*b* on both sides of the second frame member 2 are placed on and laser-welded to the outer panel 3. The first frame member 1 has a hat-shaped cross-section shown in the example in FIG. 1B or a Z-shaped cross-section shown in the example in FIG. 2B and includes flanges 1*b* on both sides thereof. The first frame member 1 is disposed in a straddling manner on the outer panel 3 and the end portion 2*a* of the second frame member 2. More specifically, one of the flanges 1*b* is placed on and weld-joined to the end portion 2*a* of the second frame member 2 by one of laser welding, spot welding, and the plug welding described above, and the other flange 1*b* is placed on and weld-joined to the outer panel 3 by laser welding or spot welding. With this configuration, the vertically and horizontally arranged frame members 1 and 2 can be laser welded to the outer panel 3. In addition, the vertically and horizontally arranged frame members 1 and 2 are mutually joined and joined to the outer panel in an improved manner, and the joint strength and the joining strength can be improved by effectively utilizing the mechanical shapes of the frame members 1 and 2.

Figure 5:
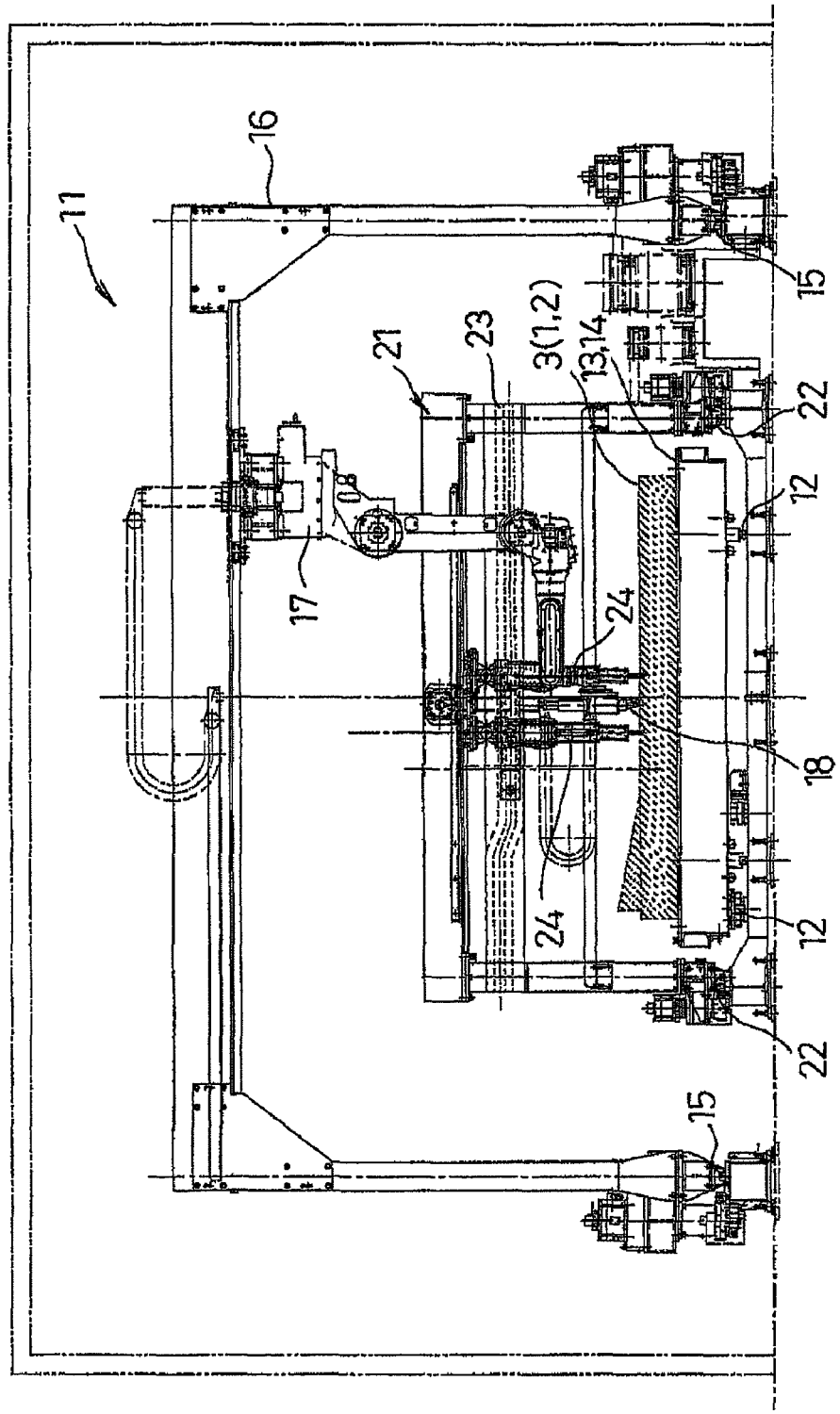
FIG. 5 is a horizontal cross-sectional view illustrating a laser welding facility used for welding of the weld-joining portions in the embodiment.
Figure 7A:
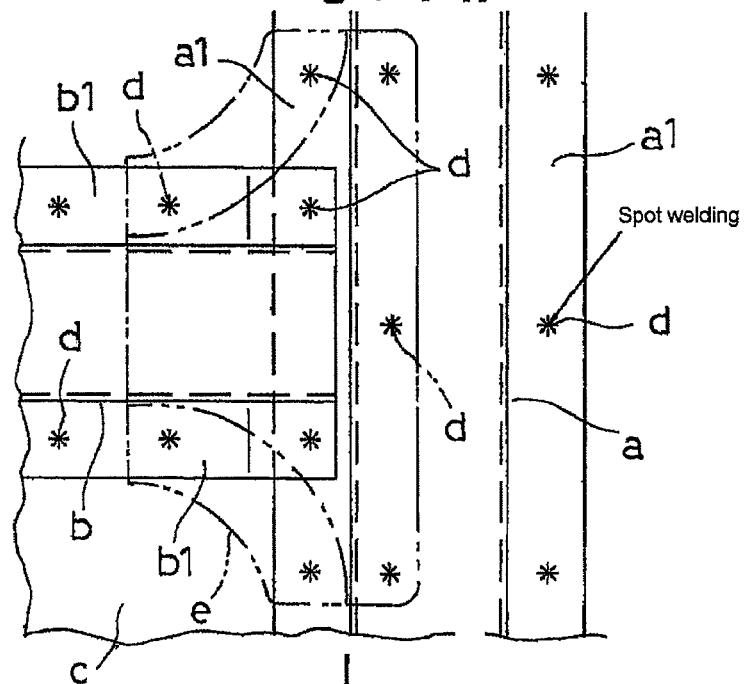
FIGS. 7A to 7C show an example of a conventional weld joining structure of an outer panel and vertically and horizontally arranged frame members, FIG. 7A being a front view from the inner side, FIG. 7B being a plan view, FIG. 7C describing spot welding.
Figure 7B:
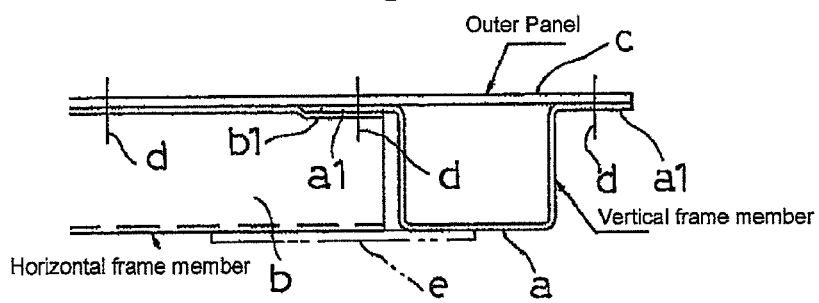
Figure 7C:
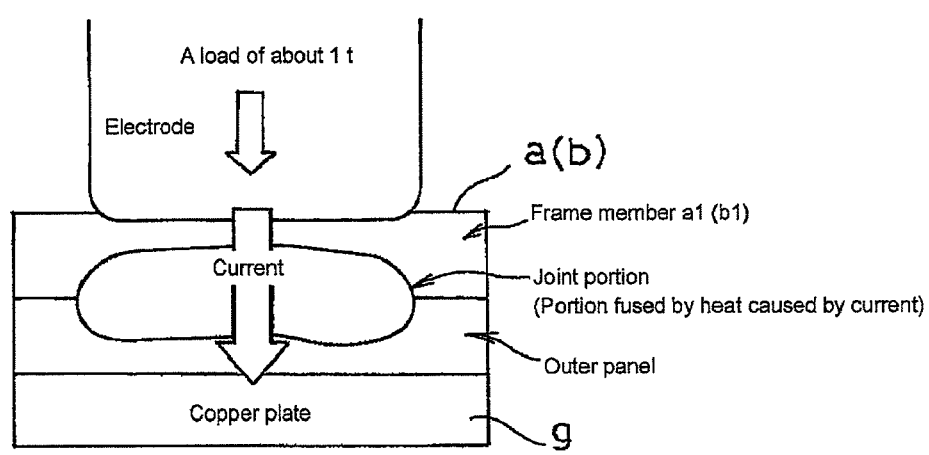
Figure 8A:
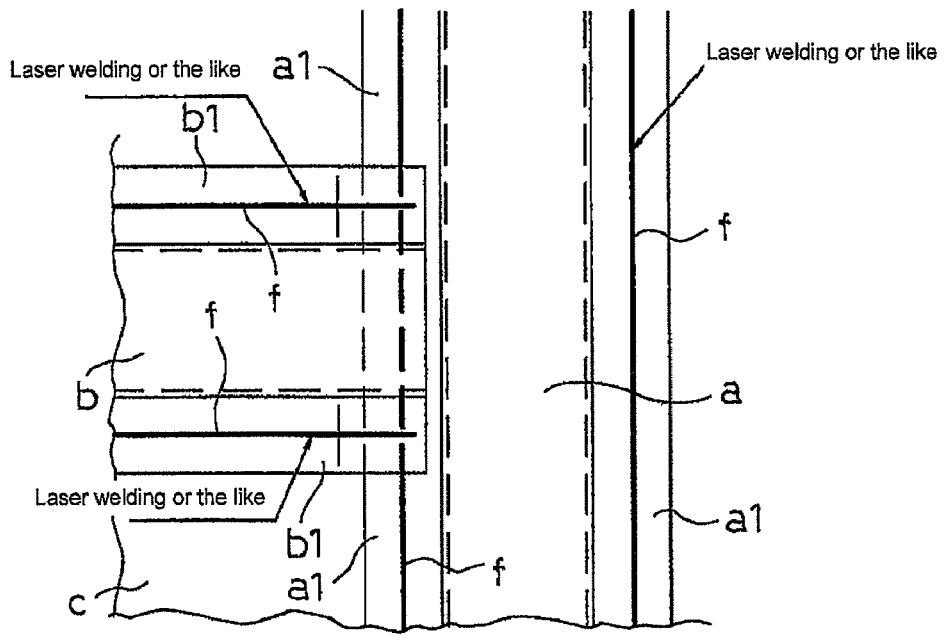
FIGS. 8A to 8C show the case in which laser welding is used in the joining example shown in FIGS. 7A to 7C, FIG. 8A being a front view from the inner side, FIG. 8B being a plan view, FIG. 8C describing spot welding.
Figure 8B:
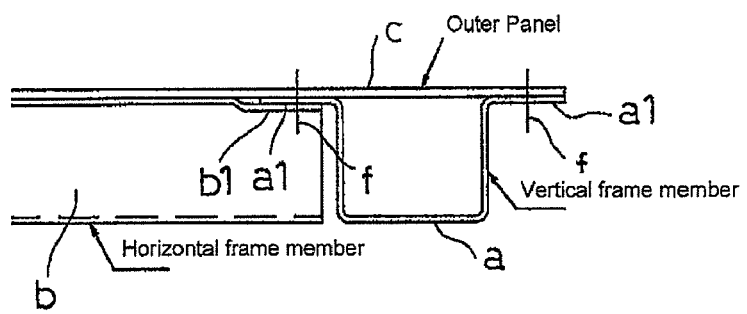
Figure 8C:
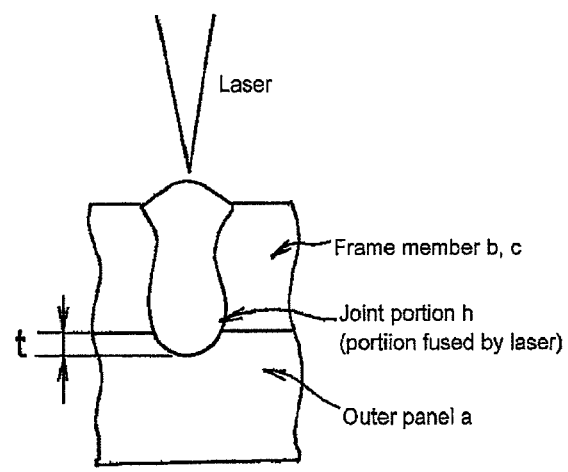

The laser welding is performed using, for example, a laser welding facility shown in FIGS. 5, 6A, and 6B. As shown in FIGS. 6A and 6B, this laser welding facility includes a welding operation unit 11 and left and right jig trucks 13 and 14 that travel on rails 12 extending across the welding to operation unit 11 in the left and right directions. Each of the left and right jig trucks 13 and 14 holds an outer panel 3 that forms a body structure of a vehicle such as the side body, roof, or end. The left and right jig trucks 13 and 14 enter the welding operation unit 11 in an alternate manner to laser-weld the held outer panel 3 to frame members 1 and 2 to be vertically and horizontally arranged thereon, and this procedure is repeated. Every time the left and right jig trucks 13 and 14 exit from the welding operation unit 11, the welded body structure placed thereon is replaced with a new outer panel 3. The welding operation unit 11 includes a gate-shaped operation leg 16 that travels on rails 15. The operation leg 16 supports an articulated robot 17 having, for example, about five joints. The frame members 1 and 2 to be vertically and horizontally arranged are laser welded to the outer panel 3 placed on the jig truck 13 entering the welding operation unit 11 through the use of the articulated robot 17. As shown in FIG. 5, the articulated robot 17 is provided with a laser torch 18 for laser welding disposed at the end portion of the robot arm. The laser torch 18 supplies a laser beam from a laser oscillating device 19 provided with a cooling mechanism through an optical fiber, and the welding areas are irradiated with the laser beam to perform laser welding in a predetermined manner. The welding operation unit 11 further includes two pressurizing mechanisms 21 for laser welding on the left and right sides thereof. The pressurizing mechanisms 21 apply downward pressure to the outer panel placed on the jig truck 13 or 14 entering the welding operation unit 11 and to the frame members 1 and 2 to be vertically and horizontally arranged on the outer panel and support them in predetermined positions for laser welding. Each of the left and right pressurizing mechanisms 21 includes a pair of pressurizing rods 24 supported by a gate-shaped supporting leg 23 traveling on rails 22, and the pressurizing and supporting operation is performed using the left and right pairs of pressurizing rods 24. The laser welding operation is controlled by a robot control unit 31 and a jig control unit 32 that are operated cooperatively.

Figure 4:
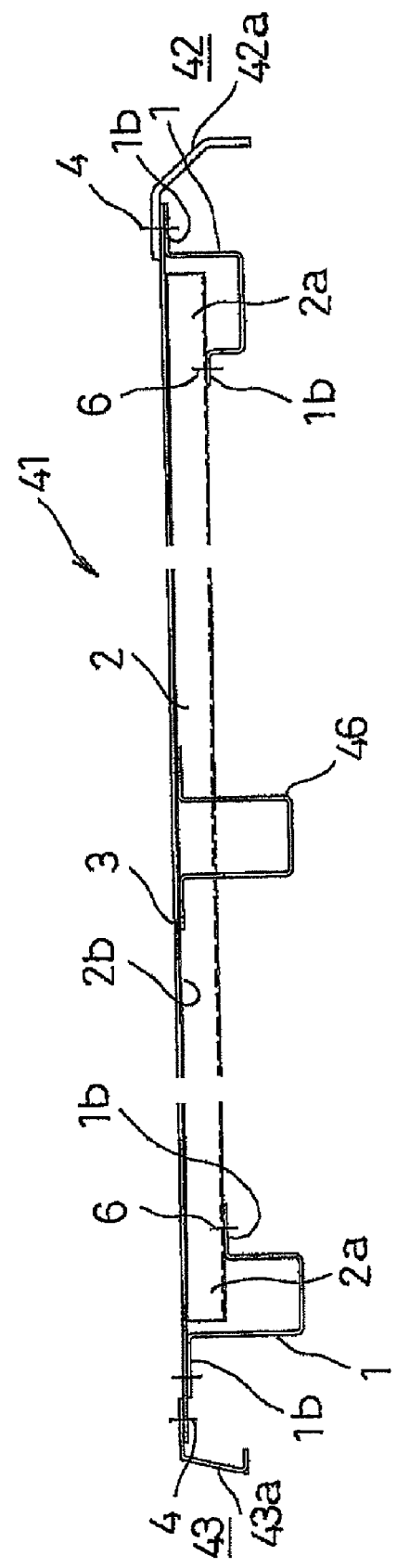
FIG. 4 is a horizontal cross-sectional view between the window and entrance door shown in FIG. 3.

FIGS. 3 and 4 show a specific example of a side body of a vehicle to which the weld-joining of the outer panel 3 to the vertically and horizontally arranged frame members 1 and 2 described above is applied. The side body 41 shown in FIGS. 3 and 4 is of the type having one opening for a window 43 between openings for entrance doors 42. The first frame members 1 are vertical frame members disposed along the openings for the window 43 and the entrance doors 42. The second frame members 2 having the end portions 2*a* facing the side surfaces of the first frame members 1 are horizontal frame members disposed between the openings for the entrance doors 42 and are horizontal frame members disposed between the opening for the window 43 and the openings for the entrance doors 42.

In railway vehicles, the outer panel 3 is often reinforced by the long horizontal frame members 2 extending in the lengthwise direction, as in the side body 41 shown in FIG. 3. In such a case, the vertical frame members 1 disposed along the openings for the window 43 and the entrance doors 42 have side surfaces facing the end portions 2*a* of a large number of horizontal frame members. Therefore, the joint strength between these frame members and the joining strength between the outer panel 3 and these frame members are important issues. To improve the joint strength and the joining strength, the specific example shown in FIGS. 3 and 4 is effective. As shown in FIG. 4, the laser weld-joined portions 4 continuous along the openings for the window 43 and the entrance doors 42 preferably serves as a waterproof measure to prevent rainwater from entering through the openings.

In the example shown in FIGS. 3 and 4, the vertical frame members 1 disposed along the openings for the window 43 and the entrance doors 42 have a hat-shaped cross-section and are independent of opening frames or opening frame members 42*a* and 43*a* disposed in the openings for the window 43 and the entrance doors 42 as shown in FIG. 4. If they are integrated and used as integrated members, the joint strength and the joining strength can be improved.

The horizontal frame members 2 are arranged at substantially regular vertical intervals in the inner-side portion of the outer panel 3 except for the openings for the window 43 and the entrance doors 42. The vertical frame members 1 are arranged along the openings and side portions of the window 43 and the entrance doors 42 of the outer panel 3 and along the edge portions of the outer panel 3 (not shown). Between the vertical frame members 1, vertical reinforcing members 46 are disposed across the horizontal frame members 2 so as to be placed thereon from inner sides thereof and are joined thereto at weld-joining portions 47 using one of plug welding, spot welding, and laser welding. In areas where the horizontal frame members 2 can be disposed, a higher priority is given to the horizontal frame members 2 than to the vertical frame members 1, so that the number of the horizontal frame members 2 disposed in those areas is greater than the number of the vertical frame members 1. In this manner, the horizontal frame members 2 are prevented from being divided by the vertical frame members 1, and the continuity of laser welding is maintained. Therefore, the required body strength can be ensured by the vertical frame members 1 significantly reduced in their number and by the reinforcing members 46 that can be joined by any welding method without affecting the outer panel 3 and the appearance. Specifically, the reinforcing members 46 are not welded to and not in contact with the outer panel, while they are arranged in a separating state with respect to the outer panel. Therefore, the strength to resist out-of-plane deformation caused by the in-plane shear force in the outer panel can be improved. For this purpose, the structures shown in the figures are preferred. More specifically, in such structures, the horizontal frame members 2 have a hat-shaped cross-section, and the flanges 2b on both sides are weld-joined to the outer panel 3. In addition, each vertical reinforcing member 46 has a hat-shaped cross-section and includes flanges 46a and notches 46b that fit the rear portions of the flanges 2b of the horizontal frame members 2. The vertical reinforcing member 46 is weld-joined to the flanges 2b of the horizontal frame members 2 with the flanges 46a abutting against the flanges 2b.

Industrial Applicability

Although the body frame structure of a railway vehicle according to the present invention has a simple joint structure that can be produced at low cost, stress can be prevented from being concentrated on end portions of ones of the vertical and horizontal frame members while the joint strength of the frame members is improved. Therefore, the body frame structure of the present invention is advantageous in terms of operation, cost, strength, and the like.

The invention claimed is:

1. A body frame structure of a railway vehicle, comprising vertically and horizontally arranged first and second frame members and an outer panel, the frame members being weld-joined to the outer panel with an end portion of the second frame member facing a vertically extending side surface of the first frame member, wherein the second frame member is weld-joined to the outer panel and has a hat-shaped cross-section, wherein the first frame member, having the vertically extending side surface, is placed in a straddling manner on the outer panel and the end portion of the second frame member and is weld-joined to both the second frame member and the outer panel, and the end portion of the second frame member being positioned between a welded flange of the first frame member and the outer panel, and wherein the hat-shaped cross-section, at an end portion of the second frame member, extends in a direction parallel to and spaced from the vertically extending side surface of the first frame member so that the end portion of the second frame member faces the vertically extending side surface of the first frame member.

2. The body frame structure of a railway vehicle according to claim 1, wherein:

the second frame member includes flanges on both sides thereof, the flanges being placed on and weld-joined to the outer panel by laser welding; and the first frame member has a hat-shaped cross-section or a Z-shaped cross-section and includes flanges on both sides thereof, one of the flanges of the first frame member being the welded flange which is placed on and weld-joined to the end portion of the second frame member by one of laser welding, spot welding, and plug welding, the other flange being placed on and weld-joined to the outer panel by laser welding.

3. The body frame structure of a railway vehicle according to claim 1, wherein the first frame member is disposed along an opening for a window or an entrance door.

4. The body frame structure of a railway vehicle according to claim 3, wherein:

the second frame member includes flanges on both sides thereof, the flanges being placed on and weld-joined to the outer panel by laser welding; and the first frame member has a hat-shaped cross-section or a Z-shaped cross-section and includes flanges on both sides thereof, one of the flanges of the first frame member being the welded flange which is placed on and weld-joined to the end portion of the second frame member by one of laser welding, spot welding, and plug welding, the other flange being placed on and weld-joined to the outer panel by laser welding.

5. The body frame structure of a railway vehicle according to claim 3, wherein the first frame member is an opening frame or an opening frame member of the opening for the window or the entrance door.

6. The body frame structure of a railway vehicle according to claim 5, wherein:

the second frame includes flanges on both sides thereof, the flanges being placed on and weld-joined to the outer panel by laser welding; and the first frame member has a hat-shaped cross-section or a Z-shaped cross-section and includes flanges on both sides thereof, one of the flanges being the welded flange of the first frame member which is placed on and weld-joined to the end portion of the second frame member by one of laser welding, spot welding, and plug welding, the other flange being placed on and weld-joined to the outer panel by laser welding.

* * * * *